United States Patent
Le et al.

(10) Patent No.: US 8,407,640 B2
(45) Date of Patent: Mar. 26, 2013

(54) SENSITIVITY-BASED COMPLEX STATISTICAL MODELING FOR RANDOM ON-CHIP VARIATION

(75) Inventors: Jiayong Le, Sunnyvale, CA (US); Mustafa Celik, Santa Clara, CA (US); Guy Maor, San Jose, CA (US); Ayhan Mutlu, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/199,222

(22) Filed: Aug. 23, 2011

(65) Prior Publication Data

US 2012/0072880 A1    Mar. 22, 2012

Related U.S. Application Data

(60) Provisional application No. 61/402,198, filed on Aug. 25, 2010.

(51) Int. Cl.
*G06F 9/455* (2006.01)
*G06F 17/50* (2006.01)

(52) U.S. Cl. ........ 716/108; 716/106; 716/110; 716/111; 716/113; 703/19

(58) Field of Classification Search .......... 716/106–108, 716/111–113; 703/19
See application file for complete search history.

(56) References Cited

U.S. PATENT DOCUMENTS

| | | | |
|---|---|---|---|
| 7,399,648 B2 * | 7/2008 | Bzowy | 438/14 |
| 7,480,881 B2 * | 1/2009 | Tetelbaum et al. | 716/113 |
| 7,707,531 B2 * | 4/2010 | Yoshikawa | 716/113 |
| 7,882,471 B1 * | 2/2011 | Kariat et al. | 716/113 |
| 7,926,019 B1 * | 4/2011 | Ravi | 716/134 |
| 2006/0090150 A1 * | 4/2006 | Kucukcakar et al. | 716/6 |
| 2006/0253820 A1 * | 11/2006 | Bzowy | 716/6 |
| 2008/0046848 A1 * | 2/2008 | Tetelbaum et al. | 716/6 |
| 2011/0035715 A1 * | 2/2011 | Lu et al. | 716/108 |
| 2011/0138347 A1 * | 6/2011 | Tetelbaum | 716/133 |

OTHER PUBLICATIONS

"Primetime Advanced OCV Technology", by Synopsys @ Apr. 2009.*
Chang,H.; Sapatnekar,S."Statistical Timing Analysis Considering Spatial Correlations Using a Single Pert-Like Traversal" ICCAD 2003 pp. 621-625.
Zhan,Y.:Strojwas, A.J.;Li, in, Pileggi, L.T.; Newmark, D.;Sharma,M. "Correlation-Aware Statistical Timing Analysiswith Non-Gaussian Delay Distributions" DAC 2005 pp. 77-82.
Hong, J.;Huang,K.;Pong, P.;Kang,J;WU,KC "An LLC-OCV Methodology for Statistic Timing Analysis" IEEE2007.
Mutlu,A.; Le, J; Molina,R.;Celik, M."A Parametric Approach for Handling Local Variation Effects in Timing Analysis" DAC'09 pp. 126-129.

* cited by examiner

*Primary Examiner* — Thuan Do
*Assistant Examiner* — Nha Nguyen
(74) *Attorney, Agent, or Firm* — Fenwick & West LLP

(57) ABSTRACT

The invention provides a method for performing statistical static timing analysis using a novel on-chip variation model, referred to as Sensitivity-based Complex Statistical On-Chip Variation (SCS-OCV). SCS-OCV introduces complex variation concept to resolve the blocking technical issue of combining local random variations, enabling accurate calculation of statistical variations with correlations, such as common-path pessimism removal (CPPR). SCS-OCV proposes practical statistical min/max operations for random variations that can guarantee pessimism at nominal and targeted N-sigma corner, and extends the method to handle complex variations, enabling graph-based full arrival/required time propagation under variable compaction. SCS-OCV provides a statistical corner evaluation method for complex random variables that can transform vector-based parametric timing information to the single-value corner-based timing report, and based on the method derives equations to bridge POCV/SSTA with LOCV. This significantly reduces the learning curve and increases the usage of the technology, being more easily adopted by the industry.

8 Claims, 5 Drawing Sheets

US 8,407,640 B2

SENSITIVITY-BASED COMPLEX STATISTICAL MODELING FOR RANDOM ON-CHIP VARIATION

RELATED APPLICATIONS

This application claims priority from U.S. provisional application 61/402,198 filed 25 Aug. 2010 by the same inventors, the entirety of which is incorporated by, reference as if fully set forth herein.

GOVERNMENT FUNDING

None

FIELD OF USE

The invention is in the field of integrated circuit timing analysis.

BACKGROUND

As the size of the chip increases and the dimension of the transistors moves to nano-meter range, process and environment variations become more and more important for the performance of the VLSI design. Variations are usually categorized into global variation (also known as chip-to-chip variation) and local variation (also known as on-chip variation, or OCV). In cutting-edge VLSI designs that are built-upon advanced manufacturing process node, the ratio of local on-chip variation over total variations keep increasing.

In static timing analysis, OCV derating techniques are widely used to model on-chip variations. One problem with OCV derating is that it uses a single number to model all on-chip variations, and consequently introduces more and more pessimism in the advanced technology nodes. To remove some pessimism, Location-based OCV (LOCV) and its derivatives were proposed to introduce logic-depth and location aware OCV techniques (see Hong, J.; Huang, K.; Pong, P.; Pan, J. D.; Kang, J.; Wu, K. C., "An LLC-OCV Methodology for Static Timing Analysis", VLSI Design, Automation and Test, 2007.

On the other hand, a lot of research has also been done on statistical static timing analysis (SSTA) to address the variation impact (see Hongliang Chang, Sachin S. Sapatnekar: Statistical Timing Analysis Considering Spatial Correlations Using a Single Pert-like Traversal. ICCAD 2003:621-626; Yaping Zhan, Andrej J. Strojwas, Xin Li, Lawrence T. Pileggi, David Newmark, Mahesh Sharma: "Correlation-aware statistical timing analysis with non-Gaussian delay distributions" DAC 2005:77-82).

SSTA is a promising methodology for modeling variations. However, the high cost of its input data preparation, including statistical library characterization and statistical extraction, impedes a rapid, wide adoption of the technology.

Parametric on-chip variation (POCV) is a methodology that provides an on-chip variation model that is derived from statistical static timing methodologies, but that does not require expensive statistical library characterization and statistical RC parasitic extraction (see Ayhan Mutlu, Jiayong Le, Ruben Molina, Mustafa Celik, "A parametric approach for handling local variation effects in timing analysis", IEEE/ACM International Conference on Computer Aided Design (ICCAD), November 2009). However, POCV as taught therein stopped short of addressing the excessive computing resources typically required when processing random variations. The need remains for a method of on-chip variation modeling in statistical timing analysis that is sufficiently low cost so as to encourage widespread and rapid adoption, where cost factors include input data preparation as well as computing resources.

BRIEF SUMMARY OF THE INVENTION

The invention provides an improved methodology for performing timing analysis of integrated circuits. The invention further provides a method for performing statistical static timing analysis that uses a novel on-chip variation model, referred to as Sensitivity-based Complex Statistical On-Chip Variation (SCS-OCV).

In particular, the inventive SCS-OCV provides at least these three innovations: First, the inventive SCS-OCV introduces complex variation concept to resolve the blocking technical issue of combining local random variations. This enables the accurate calculation of statistical variations with correlations, such as common-path pessimism removal (CPPR).

Secondly, the inventive SCS-OCV proposes practical statistical min/max operations for random variations that can guarantee pessimism at nominal and targeted N-sigma corner, and extended the method to handle complex variations. This enables the graph-based full arrival/required time propagation under variable compaction.

Thirdly, the inventive SCS-OCV provides a statistical corner evaluation method for complex random variables that can transform vector-based parametric timing information to the single-value corner-based timing report, and based on the method, derives equations to bridge POCV/SSTA with LOCV. This significantly reduces the learning curve and increases the usage of the technology, being more easily adopted by the industry.

The invention provides at least these three novel and innovative techniques, critical to providing an efficient and user-friendly SCS-OCV solution.

BRIEF DESCRIPTION OF THE DRAWINGS

The following drawing are provided to aid in understanding the invention.

DETAILED DESCRIPTION OF AN EMBODIMENT ACCORDING TO THE INVENTION

Figure 1:
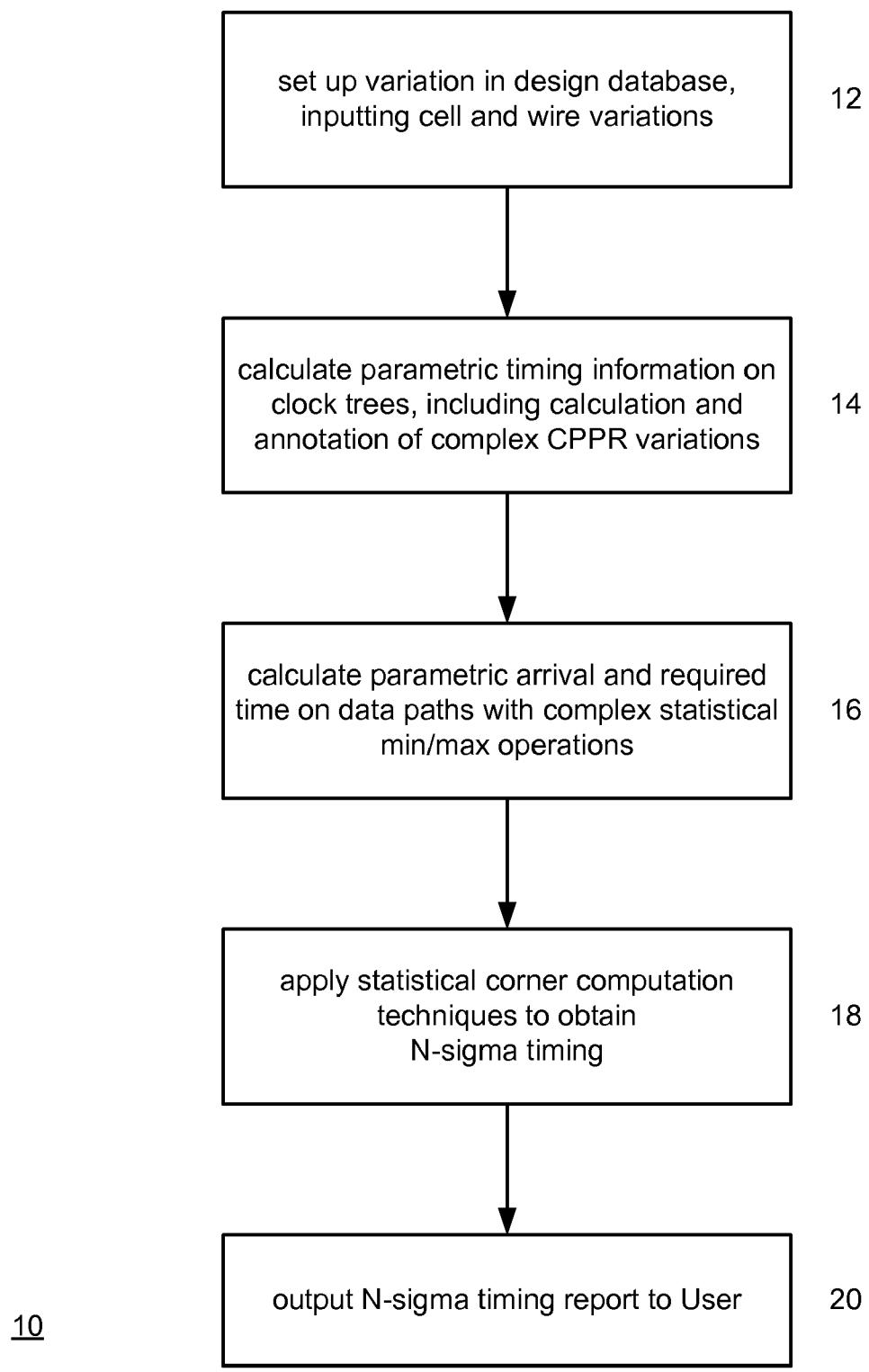
FIG. 1 is a flowchart illustrating an embodiment of the inventive method.

A method according to the invention is illustrated in FIG. 1.1, a flowchart illustrating the inventive method SCS-OGV. As applied to integrated circuit timing analysis, a preferred embodiment of the inventive method 10 comprises the steps of:

step 12 setting up variation in design database, including inputting cell and wire variation;

step 14 calculating parametric timing information on clock trees, including calculation and annotation of complex CPPR (common-path pessimism removal) variations;

step 16 calculating parametric arrival and required time on data paths with complex statistical min/max operations;

step 18 applying statistical corner computation technique to obtain N-sigma timing; and step 20 outputting N-sigma timing report to user.

One of average skill in the relevant art can appreciate this improved method. The discussion below is intended to aid in the comprehension of the method taught herein.

1. Complex Random Variable

In static timing analysis, VLSI designs are described as a netlist that contains different kind of cells and their interconnection. Current approaches to statistical timing methodology include those discussed in Hongliang Chang, Sachin S. Sapatnekar: Statistical Timing Analysis Considering Spatial Correlations using a Single Pert-Like Traversal, ICCAD 2003: 621-626; and Yaping Zhan, Andrzej J. Strojwas, Xin Li, Lawrence T. Pileggi, David Newmark, Mahesh Sharma: "Correlation-aware Statistical Timing Analysis with Non-Gaussian Delay Distributions," DAC 2005: 77-82.

As do the above cited current statistical static timing methodologies, the inventive SCS-OCV approach set forth herein, models local random variations as independent statistical random variables for each cell. And the individual cell delay can be expressed as a linear function of that specific variable in a parametric form.

For example, if we know the cell nominal delay is "a", and the timing impact of local random variation has a standard deviation of "b", then we can express the cell delay "d" with the following equation. In the equation, p is a standard normal random variable.

$$d = a + b \cdot p \tag{1}$$

During timing propagation, we can propagate these parametric delay expressions across the timing graph. Equation (2) calculates the arrival time via a path as the sum of all the cell delays $d_1, d_2, d_3, \ldots, d_n$, represented as $$\sum_{i=1}^{n} d_i,$$

where i represents a running variable that takes values from 1 to n.

$$\text{arrival}_{time} = \sum_{i=1}^{n} d_i = \sum_{i=1}^{n} (a_i + b_i \cdot p_i) \tag{2}$$

Note that because individual delay variations are treated as statistical independent random variables, we cannot directly group different $b_i.p_i$ by adding their coefficients. However, keeping all the individual $b_i.p_i$ will significantly increase the computation cost and memory requirements, which is not feasible. A common technique is to group the multiple independent variables into single variable as in equation (3). In equation (3), the term $$\sum_{i=1}^{n} a_i,$$

represents the sum of values $a_1, a_2, a_3, \ldots, a_n$, where i is a running variable that takes values from 1 to n and the term $$\sum_{i=1}^{n} b_i^2,$$

represents the sum of values $b_1^2, b_2^2, b_3^2, \ldots b_n^2$, where i is a running variable that takes values from 1 to n.

$$\text{arrival}_{time} = \sum_{i=1}^{n} a_i + \sqrt{\sum_{i=1}^{n} b_i^2} \cdot p \tag{3}$$

Compaction of multiple random variables into one variable resolves the memory problem. However, through compaction, one loses track of correlation, and correlation is particularly important when the circuit has common path on the clock tree.

Figure 2:
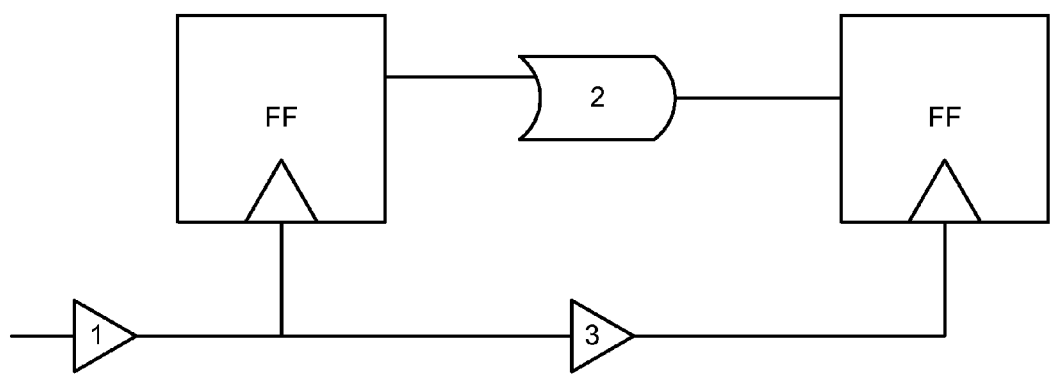
FIG. 2 illustrates a circuit with CPPR.

FIG. 2 shows a circuit that has five cells. If we ignore the delay and constraints from two flip-flops, we can calculate the arrival time and require time of the circuit as:

arrival=d1+d2 require=d1+d3

Assume each cell has 100 pico second cell delay and 10% random delay variations, the arrival time and require time can then be expressed as arrival=100+10p1+10p2 require=100+10p1+10p3

If we keep individual random variables, we can calculate the slack as required time minus arrival time slack=10p3−10p2 slack$_{3sigma}$=−30$\sqrt{2}$

However, if we compact multiple random variables into one as described in Equation (3), the arrival time and require time we will end up having is arrival=100+10$\sqrt{2}$p require=100+10$\sqrt{2}$p As you can see, we no longer know what part of the arrival and require time is from common cell. In other words, we lose the statistical correlation information. To guarantee pessimism, we have to assume that there is no common part of arrival time and require time.

slack=$\sqrt{2 \cdot 10^2 + 2 \cdot 10^2}$p=20p slack$_{3sigma}$=−60

It is clear that with compaction, there is a significant amount of pessimism introduced. Actually the same problem also exists in non-statistical STA when different OCV derating factors were applied to the same common clock cells in Min and Max mode. In STA, it is called common path pessimism. And people usually introduce some adjustment at the output of cell 1, and apply that during slack calculation. In full SSTA analysis that keeps delay sensitivities for different cells, the problem no long exists because the same cell variations will get canceled naturally. However, when we combine individual random variations, the problem comes back and we need some solution for that.

Using the same circuit in FIG. 2, if we assume individual cell delays have following parametric delay expressions:

$$d_1 = a_1 + b_1 p_1$$

$$d_2 = a_2 + b_2 p_2$$

$$d_3 = a_3 + b_3 p_3 \quad (4)$$

If we do not compact independent random variables, we can calculate the slack of the circuit as $$\text{arr} = (a_1 + a_2) + b_1 p_1 + b_2 p_2$$

$$\text{req} = (a_1 + a_3) + b_1 p_1 + b_3 p_3$$

$$\text{slack} = (a_3 - a_2) + b_3 p_3 - b_2 p_2 \quad (5)$$

And if we do the compaction on the fly, we will only have one random variable for arrival time and require time, and when we calculate the slacks, we have to do a root sum squares (RSS) to calculate the slack variation. To remove the pessimism, we would like to introduce some adjustment on the variation part as well.

$$\text{arr} = (a_1 + a_2) + \sqrt{(b_1^2 + b_2^2)} p$$

$$\text{req} = (a_1 + a_3) + \sqrt{(b_1^2 + b_3^2)} p$$

$$\text{slack} = (a_3 - a_2) + \sqrt{(2b_1^2 + b_2^2 + b_3^2)} p + \text{adjustment} \quad (6)$$

We would like to see whether the slack distribution after the adjustment can match the slack distribution we calculated without compaction. Since the nominal part already matches between equation (5) and equation (6), we only need to match the sigma part.

$$(2b_1^2 + b_2^2 + b_3^2) + \text{adjustment}^2 = b_2^2 b_3^2$$

$$\text{adjustment}^2 = 2b_1^2 p^2$$

As we can see, the adjustment we would like to have has a negative variation. To achieve that, we extend the definition of variation into the complex domain so that we can have negative variance. Equation (7) represents a complex variable var as a sum of a real component $\alpha$ and an imaginary component $\beta$ where i represents $\sqrt{-1}$.

$$\text{var} = \alpha + \beta i \quad (7)$$

When we add the individual delays to calculate the arrival time, or subtract the arrival time from require time to calculate the slack, we have to add and subtract these complex variables. Since we always assume the compacted variables are independent variables, addition and subtraction has same impact on variation part. The equations listed below gives the compaction rules while adding different complex variables.

Because we always assume the compacted variables are independent variables, addition and subtraction follow the same set of equations. Equation (8) represents addition of two individual delays represented as complex terms $\alpha_i + \beta_i i$ and $\alpha_j + \beta_j i$.

$$\alpha_i p_i + \alpha_j p_j = \sqrt{a_i^2 + a_j^2} \cdot p \quad (8)$$

-continued $$(\beta_i i) p_i + (\beta_j i) p_j = \left( \sqrt{\beta_i^2 + \beta_j^2} \, i \right) \cdot p$$

$$\alpha p_i + (\beta_j i) p_j = \begin{cases} \sqrt{\alpha_i^2 - \beta_j^2} \, p, & \beta_j^2 < \alpha_i^2 \\ \left( \sqrt{\beta_j^2 - \alpha_i^2} \, i \right) p, & \beta_j^2 \geq \alpha_i^2 \end{cases}$$

From equation set (8) we can see that the compaction in addition of real variables always leads to real variables, and the compaction of addition of imaginary variables always leads to imaginary variables. Compacting a real variable with an imaginary variable during addition can lead to either a real variable or an imaginary variable.

Going back to our simple example, using the proposed complex variable concept, we can easily express the adjustment as an imaginary number as follows.

$$\text{adjusment} = (\sqrt{2} b_1 i) p \quad (9)$$

The adjustment only contains b1, and is not a function of b2 and b3. Therefore, it can be pre-calculated without having the knowledge of complete paths. This makes it possible to combine the technique with the traditional common path pessimism removal for non-statistical static timing analysis.

2. Statistical Max Operations

Figure 3:
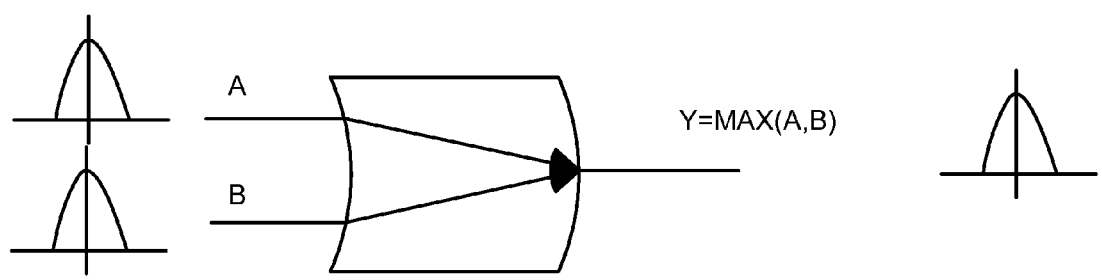
FIG. 3 illustrates max operations in graph-based timing analysis.

SCS-OCV can be applied on path-based timing analysis as well as graph-based full-chip timing analysis. In graph-based timing analysis, when arrival times from two paths converge, the bigger one will be selected for further propagation (in max mode). When arrival time becomes a statistical distribution, the calculation of max of two arrival times now becomes more complicated. FIG. 3 shows the statistical max operation for a two-input cell.

A significant amount of research has been done on statistical max operations, as can be appreciated by referring to the references cited. Proposed methods include preserving the statistical mean and standard deviation of max of two statistical arrival times, or using quadratic model for statistical max operations. Such max operations work well if Users are interested in predicting the moments such as mean and standard deviation of the final slack distributions. However, static timing analysis needs to make sure that the VLSI circuit works at specified corners. Therefore, guaranteed guard-bound at targeted corner point (e.g. 3 sigma corner or 6 sigma corner) is needed. Current statistical max operations do not have this characteristic. Another issue with the existing statistical max operation is that they do not obey Associative and Distributive rules due to the approximation errors in the operation.

$$\text{Max}(\text{Max}(A,B),C) \neq \text{Max}(A,\text{Max}(B,C))$$

$$\text{Max}(\text{Max}(A,C),\text{Max}(B,C)) \neq \text{Max}(A,\text{Max}(B,C))$$

Figure 4:
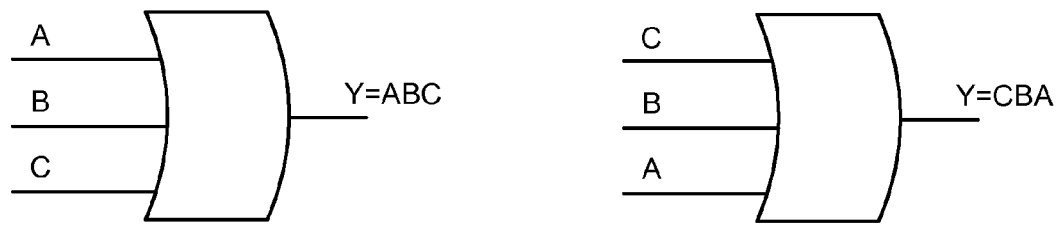
FIG. 4 illustrates the circuit of FIG. 3 with different pin order.

Because of this, statistical static timing analysis of the following two circuits may generate different timing results. As depicted in FIG. 4 below, this definitively does not look right from a VLSI circuit designer's point of view.

In SCS-OCV, we derived our statistical max operation so that it preserves both nominal and N sigma corner delay values. The number N is a user specified value based on their confidence requirement.

Define $d_A$ and $d_B$ as two parametric delays:

$$d_A = a_A + b_A p$$

$$d_B = a_B + b_B p$$

Our statistical MAX of $d_A$ and $d_B$ can be calculated uses the following equation, where the non-capital max operation is the regular max operation on real numbers.

$$d_Y = a_Y + b_Y p = \text{MAX}(d_A, d_B) \tag{10}$$

$$a_Y = \max(a_A, a_B)$$

$$b_Y = \frac{\max(a_A + N \cdot b_A, a_B + N \cdot b_B) - \max(a_A, a_B)}{N}$$

We can easily prove that the above statistical max operations preserve the pessimism at N sigma. In other words, $d_Y$ is greater than $d_A$ and $d_B$ at N sigma.

$$d_{Y_{Nsigma}} = a_Y + N \cdot b_Y$$

$$= \max(a_A, a_B) + N \cdot \frac{\max(a_A + N \cdot b_A, a_B + N \cdot b_B) - \max(a_A, a_B)}{N}$$

$$= \max(a_A + N \cdot b_A, a_B + N \cdot b_B)$$

Furthermore, it follows the Associative and Distributive rules.

$$\text{Max}(\text{Max}(A, B), C) = \text{Max}(A, \text{Max}(B, C))$$

$$= \text{Max}(\text{Max}(A, C), \text{Max}(B, C))$$

$$= \max(A_\mu, B_\mu, C_\mu) +$$

$$\frac{\max(A_\mu + N \cdot A_\sigma, B_\mu + N \cdot B_\sigma, C_\mu + N \cdot C_\sigma) - \max(A_\mu, B_\mu, C_\mu)}{N} p$$

Using the transform of $\min(x,y) = -(\max(-x,-y))$, we can derive the statistical Min operation in similar manner $$d_Y = a_Y + b_Y p = \text{Min}(d_A, d_B) \tag{11}$$

$$a_Y = \min(a_A, a_B)$$

$$b_Y = \frac{\min(a_A, a_B) - \min(a_A - N \cdot b_A, a_B - N \cdot b_B)}{N}$$

Now we have a MAX operation that can preserve worst corner and follow Associative and Distributive rules. Next we would like to extend the MAX operation to handle complex random variations with both real and imaginary components. Before we derive complex statistical MIN/MAX operation, it is useful to first check where such operations are needed. It turns out that the most common place for complex statistical MIN/MAX operation is the required time propagation on the data paths.

Figure 5:
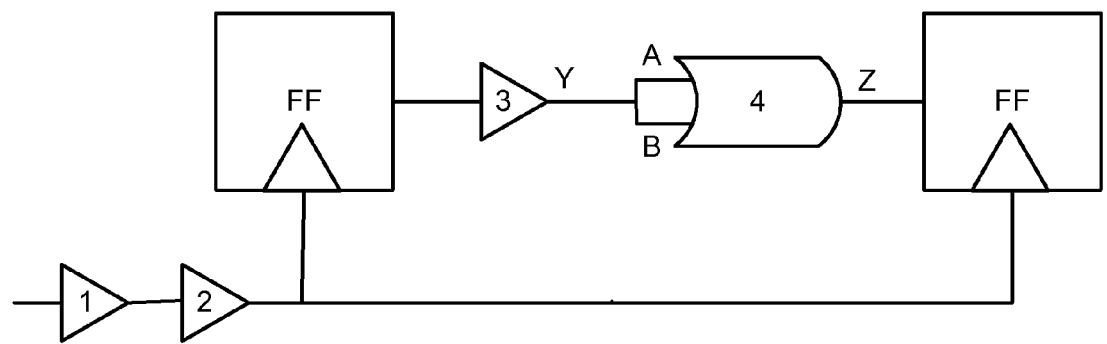
FIG. 5 illustrates a circuit convergence in required time propagation.

Consider the circuit in FIG. 5, where we assign each cell arc delay to be 10 ps. We also assign 10% variation for all arcs except the B->Y arc in cell 4. We also define clock cycle to be 20 ps. Using the compaction and max operation defined in the preceding section, we can calculate the arrival time, slack and require time for pin Z.

Please note that the physical required time and CPPR (common path pessimism removal) adjustment are grouped together. Consequently, there is an imaginary variation part in required time.

arr=40+2p slack=√2p req=40+(√2i)p

To propagate required time back from Z pin to Y pin, we need to calculate the required time from Z to A and from Z to B and take the minimum.

req$_{z \to A}$=40+(√2i)p−(10+p)=30+ip req$_{z \to B}$=40+(√2i)p−10=30+(√2i)p req$_Y$=min(30+ip, 30+(√2i)p)

For this simple circuit in FIG. 5, we know that arc A->Z is on critical path. Therefore, we would like to see required time at Y pin is the same as the required time from Z->A. In general, we would like to see that the bigger the imaginary components are, the smaller the corner will be. Remember that the imaginary variation component we introduced was mainly used to cancel the double counted variation. Therefore, the N-sigma corner for an imaginary variable should move to the opposite direction compared with its real variable counterpart.

$(a+bp)_{N_{Sigma}} = a + N|b|$ $(a+(bi)p)_{N_{Sigma}} = a - N|b| \tag{12}$

Given the corner definition in equation (12), we can derive the generalized statistical Max operations for complex statistical variables as in equation (13).

$$d_Y = \text{Max}(d_A, d_B) = \begin{cases} a_Y + b_Y p & (b_Y > 0) \\ a_Y + (-b_Y i)p & (b_Y < 0) \end{cases} \tag{13}$$

$$a_Y = \max(a_A, a_B)$$

$$b_Y =$$

$$\begin{cases} \frac{\max(a_A + N \cdot |b_A|, a_B + N \cdot |b_B|) - \max(a_A, a_B)}{N} & b_A \in R, b_B \in R \\ \frac{\max(a_A + N \cdot |b_A|, a_B - N \cdot |b_B|) - \max(a_A, a_B)}{N} & b_A \in R, b_B \in I \\ \frac{\max(a_A - N \cdot |b_A|, a_B + N \cdot |b_B|) - \max(a_A, a_B)}{N} & b_A \in I, b_B \in R \\ \frac{\max(a_A - N \cdot |b_A|, a_B - N \cdot |b_B|) - \max(a_A, a_B)}{N} & b_A \in I, b_B \in I \end{cases}$$

Statistical Min operations have similar form.

$$d_Y = \text{Min}(d_A, d_B) = \begin{cases} a_Y + b_Y p & (b_Y > 0) \\ a_Y + (-b_Y i)p & (b_Y < 0) \end{cases} \tag{14}$$

$$a_Y = \min(a_A, a_B)$$

$$b_Y =$$

$$\begin{cases} \frac{\min(a_A, a_B) - \min(a_A + N \cdot |b_A|, a_B + N \cdot |b_B|)}{N} & b_A \in R, b_B \in R \\ \frac{\min(a_A, a_B) - \min(a_A + N \cdot |b_A|, a_B - N \cdot |b_B|)}{N} & b_A \in R, b_B \in I \\ \frac{\min(a_A, a_B) - \min(a_A - N \cdot |b_A|, a_B + N \cdot |b_B|)}{N} & b_A \in I, b_B \in R \\ \frac{\min(a_A, a_B) - \min(a_A - N \cdot |b_A|, a_B - N \cdot |b_B|)}{N} & b_A \in I, b_B \in I \end{cases}$$

Given the formula above, we can easily finish the calculation for the example $$req_Y = \min(30 + ip, 30 + (\sqrt{2} i)p)$$

$$= \min(30, 30) + \frac{\min(30, 30) - \min(30 + N, 30 + \sqrt{2}\,N)}{N}(-ip)$$

$$= 30 + \frac{30 - (30 + N)}{N}(-ip) = 30 + ip$$

Graph-based Arrival Time and Required Time propagations are two main areas that statistical MIN/MAX operation can be applied. There are also many other places that require MIN/MAX operation to model variation correctly. One such place is Latch time-borrowing calculation.

Unlike edge-triggered flip-flop, Latch has a transparent period in which it is always on. In other words, signal can always propagate through when latch is on. This creates challenges for static timing analysis which relies on a clear definition of clock period and the isolation between different combination blocks. Please refer to the example of latch circuits, 5a, on sheet 3 of the figures.

In static timing analysis, a technique called time borrowing is widely used to model the impact of latch's on-period. The basic idea is illustrated in the graph 5b, Time Borrowing in Latch Circuits, on sheet 3 of the figures.

Basically, when the signal arrival is after the latch is open, but before the latch closes, the difference between the data arrival time and latch open time can be treated as the time this combinational block borrowed from next combinational block. If the signal arrival is after latch close time, then the whole open period is treated as borrowed time. In static timing analysis, the borrowed time is calculated using the following piece-wise functions:

$$\text{borrowed time} = \begin{cases} 0 & (\text{arrival} < \text{latch open}) \\ \text{arrival} - \text{latch open} & (\text{latch open} < \text{arrival} < \text{latch close}) \\ \text{latch close} - \text{latch open} & (\text{arrival} > \text{lach close}) \end{cases}$$

Figure 6A:
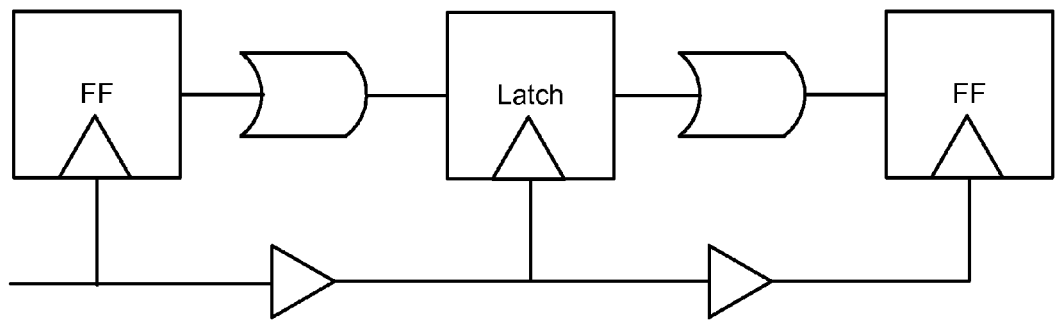
FIG. 6A shows an example of latch circuits.
Figure 6B:
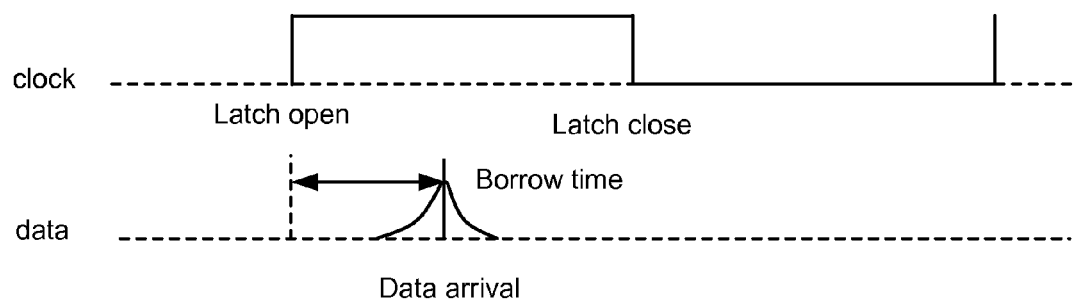
FIG. 6B illustrates time borrowing in latch circuits.
Figure 6C:
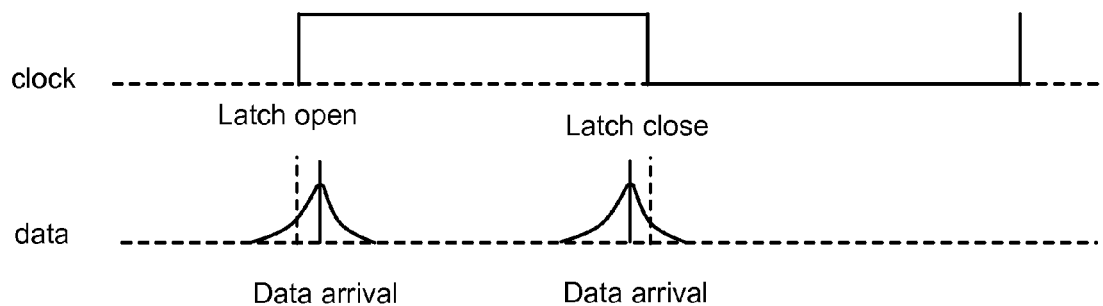
FIG. 6C illustrates variations at around latch open/close edge.

When we have variations, however, expressing borrowed time as a simple piecewise linear function is no longer enough. Due to variation, there is no clear boundary at latch open and latch close points. As shown in FIG. 6C it is possible that the nominal value of data arrival time may be within the latch open period while the 3 sigma bounds are outside of the period.

Instead of using a piecewise linear function to calculate the borrowed time, we need a better formula that can generate continuous model near the latch open and closing edges.

Figure 6D:
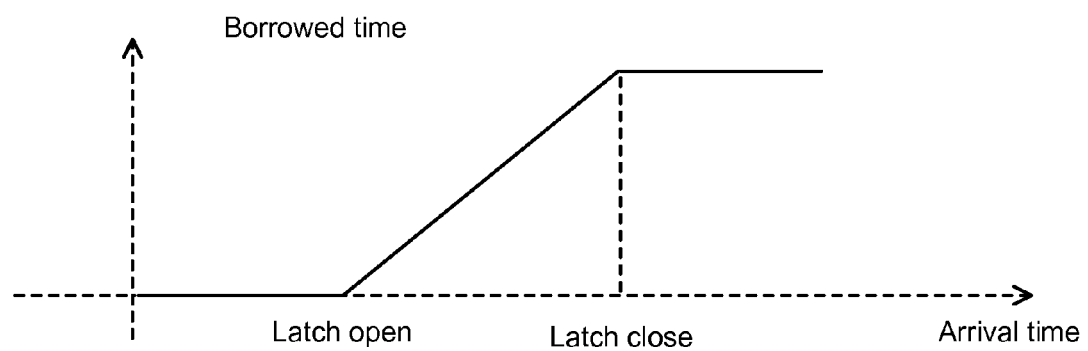
FIG. 6D illustrates borrowing time as a function of arrival time.

To help deriving the proper formula, we can plot the borrowed time as a function of arrival time in FIG. 6D. With simple derivations, we can prove that the following formula also generates the same plot.

borrowed time=Min(latch on period, Max(data arrival−latch open, 0))

When there are no variations, the equation above will generate exact same plot as FIG. 6D when there are variations, we can apply the derived statistical MIN/MAX operation, which will guarantee the continuity at given statistical corners.

3. Statistical Corner Evaluation

SCS-OCV and SSTA calculate and propagate the statistical distribution of delays, arrival/required times, and slacks. In the end, the user needs to check their timing at their confidence level (e.g. three sigma). If they find a timing violation at an end point, they need to trace back the path, see how they can fix the violation.

In such cases, we not only need to calculate the N sigma corner of the slack, but also need to show that under which condition the N sigma corner will be reached. For example, if we know the end point slack is a function of multiple random variables, we can calculate the N sigma corner value of the slack.

$$\text{slack} = \sum_{i=1}^{n}(a_i + b_i \cdot p_i)$$

$$\text{slack}_{Nsigma} = \sum_{i=1}^{n} a_i + N \cdot \sqrt{\sum_{i=1}^{n} b_i^2}$$

However, we also need to calculate the specific value of individual variables under which the N sigma corner slack will be reached. If we link the above two equations into one, the problem is to find a set of $p_i$ that satisfies the equation.

$$\sum_{i=1}^{n}(b_i \cdot p_i) = N \cdot \sqrt{\sum_{i=1}^{n} b_i^2} \qquad (15)$$

Since there are multiple random variables but only one equation, the above equation has infinite solutions. In SCS-OCV, we look for the solution that has highest probability as our statistical corner solution.

In equation (15), $(p_1, p_2, p_i \ldots)$ is a set of independent standard random variables. Therefore, if we plot the joint probability density function in the n-dimensional space spanned by $(p_1, p_2, p_i \ldots)$, it is easy to prove that the joint probability density function monotonically decreases when the distance between the evaluation point and the original point r increases.

On the other hand, equation (15) is actually a hyper-plane function in the same n-dimensional space. Therefore, the point we are looking for should be the point on the hyper-plane that is closest to the original point. The problem of finding the corner vector for our timing report is translated into the problem of finding the projection point of the original point to a given hyper-plane. The latter has a well defined solution:

$$p_i = N \cdot \frac{b_i}{\sqrt{\sum_{i=1}^{n} b_i^2}} \qquad (16)$$

Notice that the denominator of the equation (16) is actually the standard deviation of the slack. Therefore, although equation (16) is derived from un-compacted POCV/SSTA, the solution can be directly applied to compacted SCS-OCV and SSTA. And if $b_i$ is a complex number, the equation still holds $$b_i \cdot p_i = |b_i| i \cdot \frac{|b_i| i}{\sqrt{\sum_{i=1}^{n} b_i^2}} = -\frac{|b_i|^2}{\sqrt{\sum_{i=1}^{n} b_i^2}} \qquad (17)$$

Equation (16) can also be used to derive the equivalent stage count and derate functions for LOCV. LOCV models derating as a function of stage count on a logic path.

$$\text{derate}(n = K) = 1 + \frac{\text{derate}(n = 0) - 1}{\sqrt{K}} \quad (18)$$

Equation (18) is widely used to calculate the LOCV derating value for a cell on a path with K stages. From equation (16), we can derive stage count and derating functions (19) and (20) that makes path-based LOCV match POCV/SSTA results.

$$k_i = b_i^2 \quad (19)$$

$$\text{derating}_i(n = K) = 1 + N \cdot \frac{b_i}{a_i} \cdot \frac{b_i}{\sqrt{n = \Sigma k_j}} \quad (20)$$

As can be appreciated from the description herein, the invention provides an efficient solution that is implementable in Parametric On-Chip Variation/SSTA, and useful in the most complicated design timing challenges.

What is claimed is:

1. A computer-implemented method of statistical static timing analysis (SSTA) comprising:
   receiving, by a computer, information describing a circuit, the information comprising:
      a first input node, a second input node, and an output node, such that there is
         a first path from the first input node to the output node, and
         a second path from the second input node to the output node,
      the first path and the second path converging at the output node,
      each path associated with a parametric delay represented as a nominal delay value and a standard deviation value, the standard deviation value representing a timing impact of local random variation;
   performing statistical static timing analysis (SSTA) based on on-chip variation (OCV) model, the SSTA comprising, determining a parametric delay at the output node based on a statistical maximum of parametric delay through the first path and parametric delay through the second path, wherein the statistical maximum preserves N sigma corner delay values, and determining the statistical maximum comprises:
      determining a nominal delay value of the parametric delay at the output node based on a maximum of:
         nominal delay value of the parametric delay through the first path, and
         nominal delay of the parametric delay through the second path; and
      determining a standard deviation value of the parametric delay at the output node, comprising:
         determining a first value as a maximum of:
            a weighted sum of nominal delay value and standard deviation value of the parametric delay through the first path, and
            a weighted sum of nominal delay value and standard deviation value of the parametric delay through the second path;
         determining a second value as a maximum of:
            the nominal delay value of the parametric delay through the first path, and
            the nominal delay value of the parametric delay through the second path; and
         determining the difference between the first value and the second value; and
         standard deviation value of the parametric delay through the first path, and
         standard deviation value of the parametric delay through the second path; and
   storing the nominal delay and the standard deviation value of the parametric delay for the output node.

2. The method of claim 1, wherein responsive to a request to determine the parametric delay for the output node for an N sigma corner:
   the weighted sum of nominal delay value and standard deviation value is based on the value of N.

3. The method of claim 1, wherein responsive to a request to determine the parametric delay for the output node for an N sigma corner the weight of the standard deviation value used for computing the weighted sum for each path is based on the value of N.

4. The method of claim 1, further comprising:
   determining an arrival time for the output node based on the parametric delay of the output node.

5. The method of claim 1, further comprising:
   determining a required time for the output node based on the parametric delay of the output node.

6. The method of claim 1, further comprising:
   determining a slack time for the output node based on the parametric delay of the output node.

7. The method of claim 1, further comprising using the parametric delay for the output node determined based on the statistical maximum in a path-based timing analysis of the circuit.

8. The method of claim 1, further comprising using the parametric delay for the output node determined based on the statistical maximum in a graph-based full chip timing analysis.

* * * * *

UNITED STATES PATENT AND TRADEMARK OFFICE
CERTIFICATE OF CORRECTION

PATENT NO. : 8,407,640 B2  
APPLICATION NO. : 13/199222  
DATED : March 26, 2013  
INVENTOR(S) : Le et al.

Page 1 of 1

It is certified that error appears in the above-identified patent and that said Letters Patent is hereby corrected as shown below:

In the claims:

In claim 1, column 12, lines 17-20, delete

"standard deviation value of the parametric delay through the first path, and standard deviation value of the parametric delay through the second path; and"

Signed and Sealed this  
Sixth Day of August, 2013

Teresa Stanek Rea  
*Acting Director of the United States Patent and Trademark Office*